United States Patent [19]

Tanaka et al.

[11] Patent Number: 5,714,972
[45] Date of Patent: Feb. 3, 1998

[54] DISPLAY APPARATUS AND DISPLAY METHOD

[75] Inventors: Koichiro Tanaka, Katano; Tomohiro Kimura, Kawachinagano; Akihiro Tatsuta, Nara; Yasuo Nagaishi, Ikoma, all of Japan

[73] Assignee: Matsushita Electric Industrial Co., Ltd., Osaka, Japan

[21] Appl. No.: 601,653

[22] Filed: Feb. 14, 1996

Related U.S. Application Data

[63] Continuation of Ser. No. 264,469, Jun. 23, 1994, abandoned.

[30] Foreign Application Priority Data

Jun. 23, 1993 [JP] Japan ............... 5-174698

[51] Int. Cl.$^6$ ............................................. G09G 5/34
[52] U.S. Cl. .................... 345/121; 345/123; 345/127; 345/156
[58] Field of Search .................. 345/127, 121, 345/123, 131, 159, 169, 168, 163, 158, 2, 1; 348/39; 395/341

[56] References Cited

U.S. PATENT DOCUMENTS

| | | | |
|---|---|---|---|
| 4,642,790 | 2/1987 | Minshull | 345/121 |
| 4,730,186 | 3/1988 | Koga | 345/123 |
| 4,786,897 | 11/1988 | Takanashi | 345/121 |
| 4,787,051 | 11/1988 | Olson | 345/163 |
| 4,808,987 | 2/1989 | Takeda et al. | 345/127 |
| 4,985,762 | 1/1991 | Smith | 348/39 |
| 5,073,771 | 12/1991 | Satta et al. | 345/127 |
| 5,187,776 | 2/1993 | Yanker | 345/127 |
| 5,263,134 | 11/1993 | Paal | 345/123 |
| 5,289,168 | 2/1994 | Freeman | 345/121 |
| 5,526,481 | 6/1996 | Parks | 395/341 |

*Primary Examiner*—Xiao Wu
*Attorney, Agent, or Firm*—Ratner & Prestia

[57] ABSTRACT

A position detector 1 detects the position of a display screen 4, an image memory 2 stores image information, a selector 3 selects a portion of the image information stored in the image memory 2 in accordance with the position of the display screen 4 detected by the position detector 1 and supplies the selected portion to the display screen 4, and the display screen 4 displays the selected image information. The invention is characterized in that when it is assumed that the entire image information stored in the image memory 2 is drawn in a viewing field space fixed relative to the eye, the selector 3 selects the image information to be drawn on the display screen 4 lying in the viewing field space.

13 Claims, 7 Drawing Sheets

1

DISPLAY APPARATUS AND DISPLAY METHOD

This application is a continuation of application Ser. No. 08/264,469 filed Jun. 23, 1994, now abandoned.

BACKGROUND OF THE INVENTION

1. Field of the Invention

The present invention relates to a display apparatus for displaying graphics, text, etc., and more particularly to a display apparatus and display method in which a portion of image information is selected and displayed on the display screen.

2. Description of the Related Art

In a small display apparatus suitable for portable use, the display screen area is limited, and usually, image information to be displayed cannot be shown in its entirety on the display screen. Therefore, it is generally practiced to select a designated portion of the image information for display on the screen.

A prior art display apparatus will be described below. FIG. 1 is a block diagram showing the prior art display apparatus. In FIG. 1, the numeral 21 is a designating section for designating a portion to be displayed, 22 is an image memory, 23 is a selector for selecting the image information portion to be displayed by an instruction from the designating section, and 24 is a display screen.

The designating section 21 is used to enter a move instruction when, of the entire image information stored in the image memory 22, the portion displayed on the display screen 24 is to be moved. The image memory 22 is used to store image information. In accordance with the instruction from the designating section 21, the selector 23 selects the image information portion to be displayed on the display screen 24 from the entire image information stored in the image memory 22, and supplies the selected portion to the display screen 24 which displays the selected image information in a visually recognizable form.

Next, how the display image is moved by an instruction from the designating section 21 will be described with reference to FIG. 2. FIG. 2 shows an example of display illustrating how the displayed portion of image information is moved. As shown in FIG. 2, in the prior art display apparatus, the display image is moved, with the position of the display screen 24 fixed, in accordance with the instruction entered from the designating section 21. As the image is moved, the portion of the image that lies on the display screen 24 changes. That is, with the display screen 24 fixed with respect to the eye, the image displayed on the display screen 24 moves relative to the eye.

As described above, in the prior art display apparatus, the displayed portion of the image information is moved, with the position of the display screen fixed, in accordance with the instruction entered from the designating section. Therefore, in moving the displayed portion, the displayed image information moves relative to the eye of the operator, causing the image to flow and thus presenting a problem of reduced visibility. There is a further problem that when the display image has been moved repeatedly, for example, the operator may not be able to recognize which part of the entire image information is currently displayed.

SUMMARY OF THE INVENTION

It is an object of the present invention to provide a display apparatus which is capable of retaining the visibility of a display image during display updating and in which the position of the displayed portion within the entire image information, after updating, can be easily recognized.

To achieve the above object, the present invention provides a display apparatus which comprises position detecting means for detecting the position of a display screen, and selecting means for selecting a portion of the image information stored in image storing means, characterized in that, assuming that the entire image information stored in the image storing means is drawn in a viewing field space fixed relative to the eye, the image information drawn in a subspace that the display screen occupies in the viewing field space is shown on the display screen.

To achieve the above object, the display apparatus of the invention is characterized by the provision of enlarging/reducing means for enlarging or reducing the size of the display image.

To achieve the above object, the display apparatus of the invention is characterized in that the image information is transmitted from the selecting means to the display screen, for example, through a wireless or wired transmission path.

To achieve the above object, the present invention also provides an image display method comprising the steps of detecting the position of a display screen, designating on the basis of the detected position a portion to be displayed in a subspace that the display screen occupies in a viewing field space when the entire image information is drawn in the viewing field space, and supplying the image information corresponding to the display image portion displayed in the subspace that the display screen occupies to the display screen for viewing.

According to the above construction of the invention, assuming that the stored image information is drawn in its entirety in the viewing field space fixed relative to the eye, the image drawn in the subspace the display screen occupies in the viewing field space is selected for display on the display screen, and by moving the display screen, the displayed portion of the image information is updated accordingly; even when the position of the display screen is changed, since the displayed image information remains fixed in the viewing field space, the image visibility is retained during the movement of the display screen, and it is easy to recognize the position of the displayed portion in the entire display image.

According to the above construction of the invention, the enlarging/reducing means is provided so that the display image can be enlarged or reduced in size as desired, for enhanced viewing.

According to the above construction of the invention, the image information can be transmitted from the selecting means to the display screen through a wireless or wired transmission path, which enables the display screen to be separated from the selecting means, etc.

As described, since the image information is displayed in fixed relationship to the eye, the present invention provides the enormous practical advantages that the image is easy to view during the movement of the display screen and also that it is easy to recognize the position that the display image occupies in the entire image information.

BRIEF DESCRIPTION OF THE DRAWINGS

FIGS. 12(a) and 12(b) provide diagrams showing relations between coordinates in a viewing field space and coordinates within an image memory, wherein FIG. 12(a) shows coordinates in the viewing field space, and FIG. 12(b) shows coordinates within the image memory.

DESCRIPTION OF THE PREFERRED EMBODIMENTS (Embodiment 1)

Figure 1:
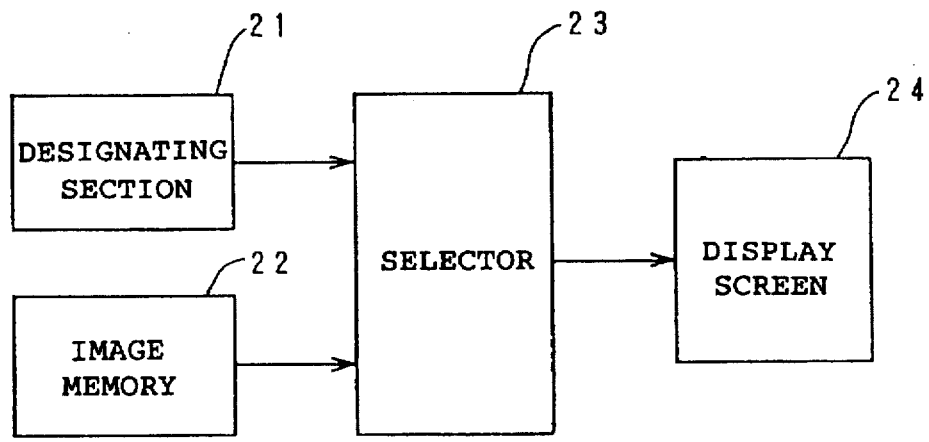
FIG. 1 is a block diagram of a prior art display apparatus.
Figure 2:
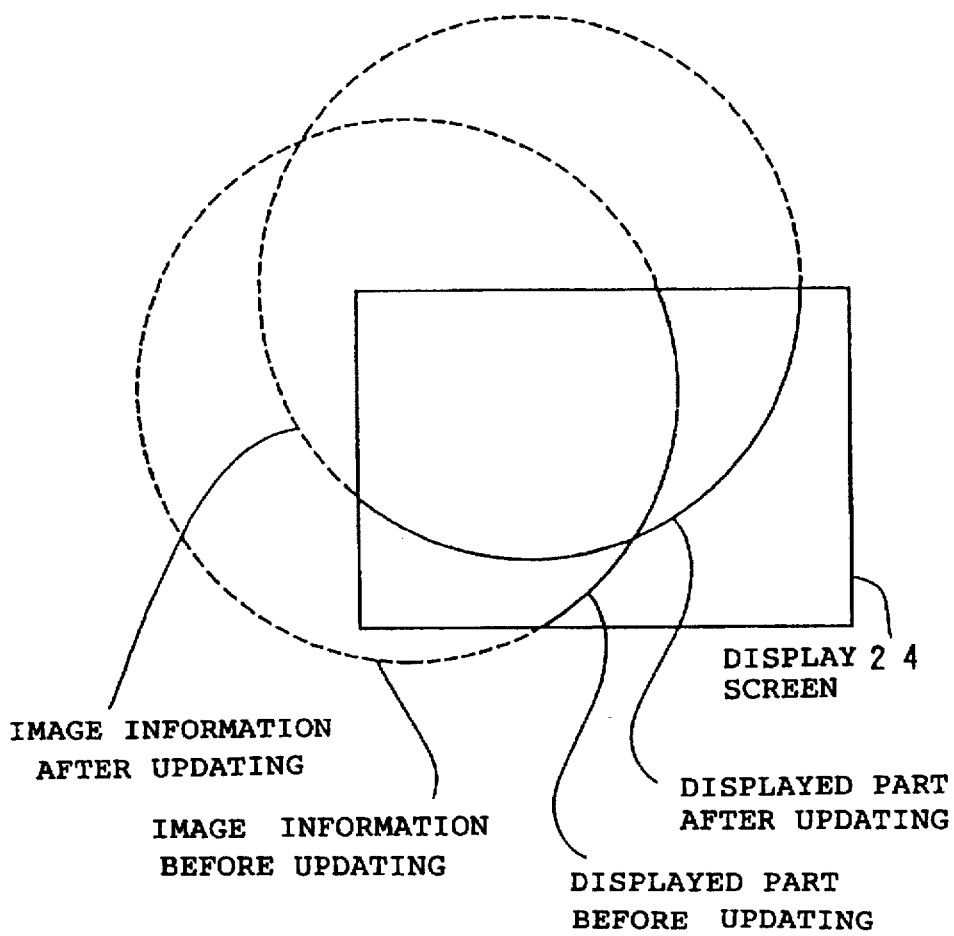
FIG. 2 is a diagram for explaining how image information is displayed on the prior art display apparatus.
Figure 3:
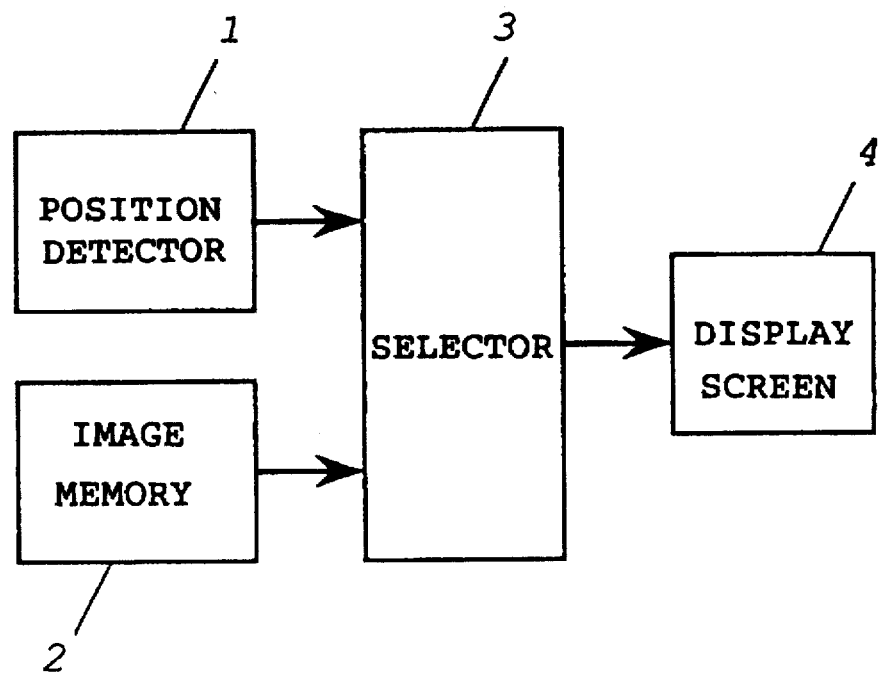
FIG. 3 is a block diagram of a display apparatus according to a first embodiment of the present invention.

FIG. 3 is a block diagram of a display apparatus according to a first embodiment of the present invention. The display apparatus of this embodiment is characterized in that the display image is selected according to the position of the display screen, the image being fixed relative to the eye of the operator.

In FIG. 3, the numeral 1 is a position detector for detecting the position of the display screen, 2 is an image memory for storing image information to be displayed on the display screen, 3 is a selector for selecting image information to be drawn, and 4 is the display screen.

Figure 13:
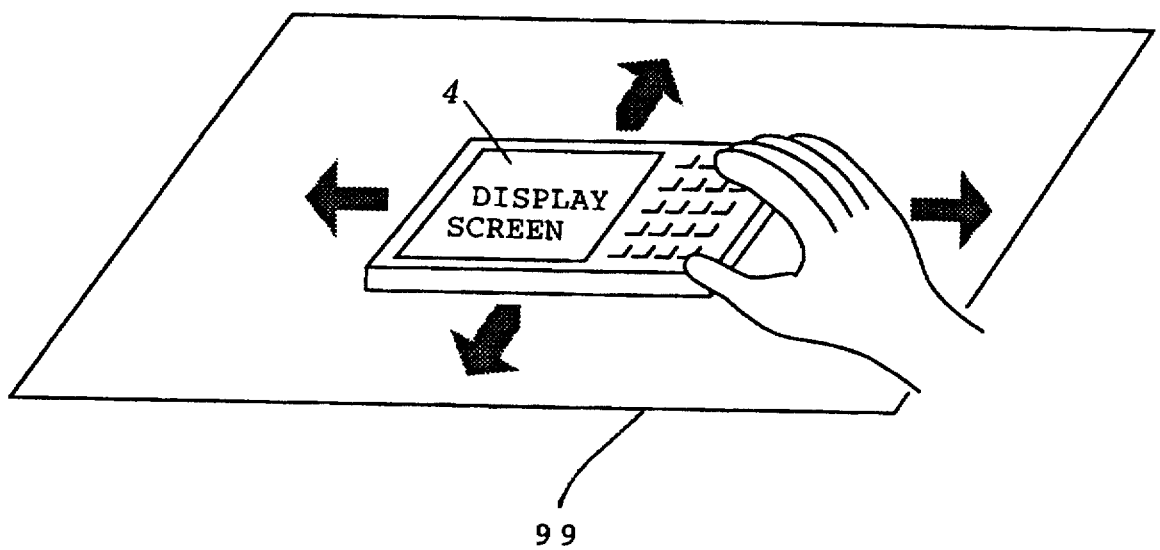
FIG. 13 is a perspective view of the embodiment of the present invention showing the sate in which a display screen is moving on a desk.

The display screen 4 is for example a small type liquid crystal display device as shown in FIG. 13, and can be moved on a desk 99 by a hand of an operator.

Figure 4:
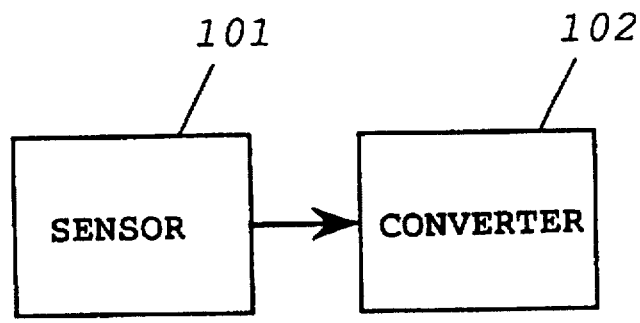
FIG. 4 is a block diagram of a position detector.

The position detector 1 consists of a sensor 101 and a converter 102, as shown in FIG. 4 to detect a position of the display screen 4. A position sensor, a velocity sensor, an acceleration sensor or the like, is used as the position detector 1. The physical quantity detected by the sensor is converted by the converter 102 into the position. When a velocity sensor or an acceleration sensor is used, an integrator is incorporated in the converter. The position detector, for example, detects the position in the horizontal and vertical directions.

Figure 5:
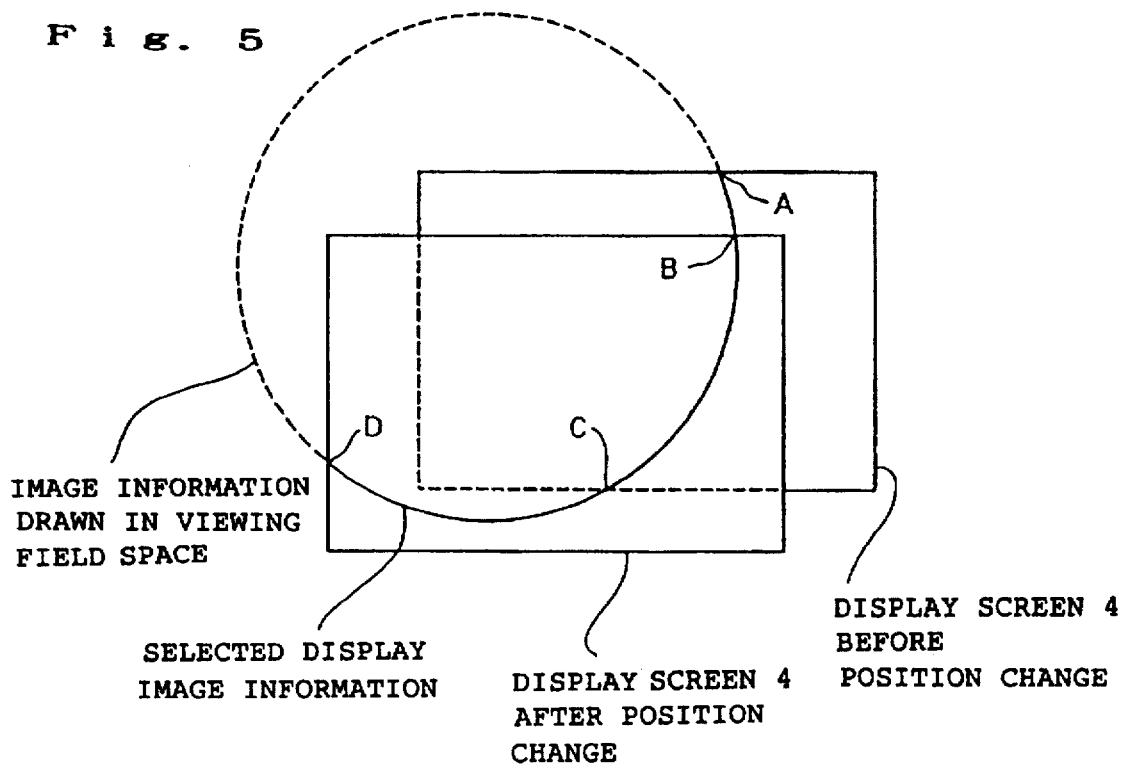
FIG. 5 is a diagram for explaining how image information is displayed on the display apparatus of FIG. 3.

Based on the position of the display screen 4 detected by the position detector 1, the selector 3 shown in FIG. 3 selects the image information to be drawn in a subspace that the display screen 4 occupies in a viewing field space, and supplies the selected image information to the display screen 4. The operation of the selector 3 will be explained by way of example with reference to FIG. 5. When it is assumed that the entire image information (a circle in the example of FIG. 5) stored in the memory storage 2 is drawn in the viewing field space fixed relative to the eye of the operator, the selector 3, based on the position of the display screen 4 detected by the position detector 1, selects the image information (the solid line part A–C in FIG. 5) drawn in the subspace that the display screen 4 occupies in the viewing field space, and supplies the selected image information to the display screen 4. When the position of the display screen 4 is changed, the selector 3 updates the selected image information, as shown in FIG. 5, according to the changed position (in FIG. 5, the solid line part B–D is selected), and supplies the updated image information to the display screen 4.

The display screen 4 is not specifically restricted in its size, shape, or other physical dimensions, but should be placed, for example as described above by FIG. 13, on a desk 99 in such a manner as to be movable with respect to the given viewing field space and should be configured to display the image information (part of the circle in the example of FIG. 5) supplied from the selector 3.

According to the display apparatus of the above configuration, the displayed information can be updated according to the position of the display screen 4. Furthermore, the image displayed on the display screen 4 constitutes a part of the image information virtually drawn in a fixed manner in the viewing field space. As a result, the displayed image also is fixed relative to the eye of the operator. This makes it easy to recognize the displayed portion of the entire image information on the basis the position of the display screen 4.

(Embodiment 2)

A second embodiment of the present invention will be described below with reference to FIG. 6. Compared with the display apparatus of the first embodiment, the display apparatus of the second embodiment is characterized in that the display screen 4 can be made separate from the other parts, allowing the housing containing the display screen to be reduced in size.

Figure 6:
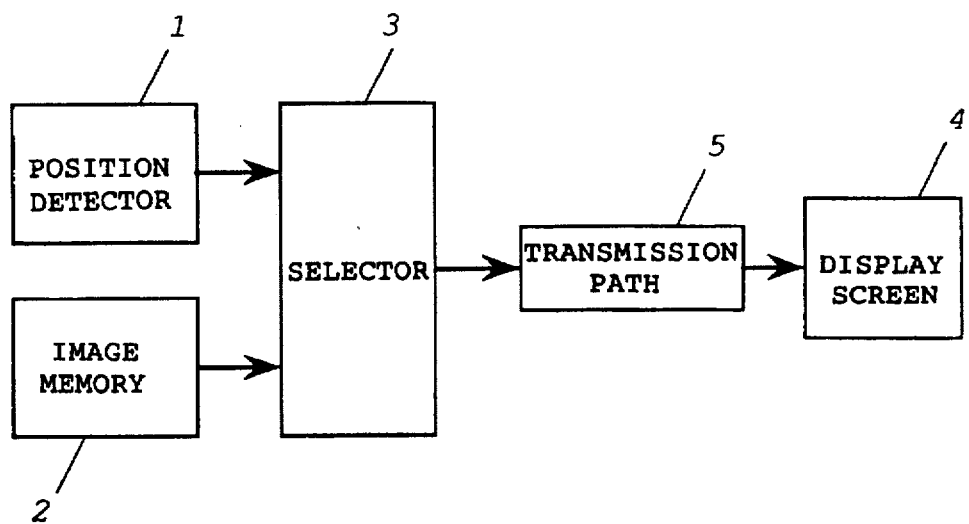
FIG. 6 is a block diagram of a display apparatus according to a second embodiment of the present invention.

FIG. 6 shows a block diagram for the display apparatus of the second embodiment. As in FIG. 3, the numeral 1 is a position detector, 2 is an image memory, 3 is a selector, and 4 is the display screen. Further, the numeral 5 indicates a transmission path for transmitting image information according to the second embodiment. The transmission path may be a wired path or a wireless path.

As in the first embodiment, the position detector 1 detects the position of the display screen 4, the image memory 2 stores image information, and the selector 3 selects image information.

The image information output from the selector 3 is transmitted over the transmission path 5 to the display screen 4.

According to this embodiment, the display screen 4 can be made separate from the other parts, allowing the housing containing the display screen 4 to be reduced in size and thus achieving improved operability. If the position detector 1 is to be provided in the same housing as the display screen 4, a transmission path for transmitting position information needs to be provided between the position detector 1 and the selector 3. In this case, the position detected by the position detector 1 is output onto the position information transmission path for transmission to the selector 3. If the position detector 1 is to be provided separately from the housing of the display screen 4, such a position information transmission path need not be provided.

(Embodiment 3)

A third embodiment of the present invention will be described below with reference to FIGS. 7 and 8. Compared with the display apparatus of the second embodiment, the display apparatus of the third embodiment is characterized in that an image enlarging/reducing function is provided for enlarging small images or reducing large images in size for easy viewing.

Figure 7:
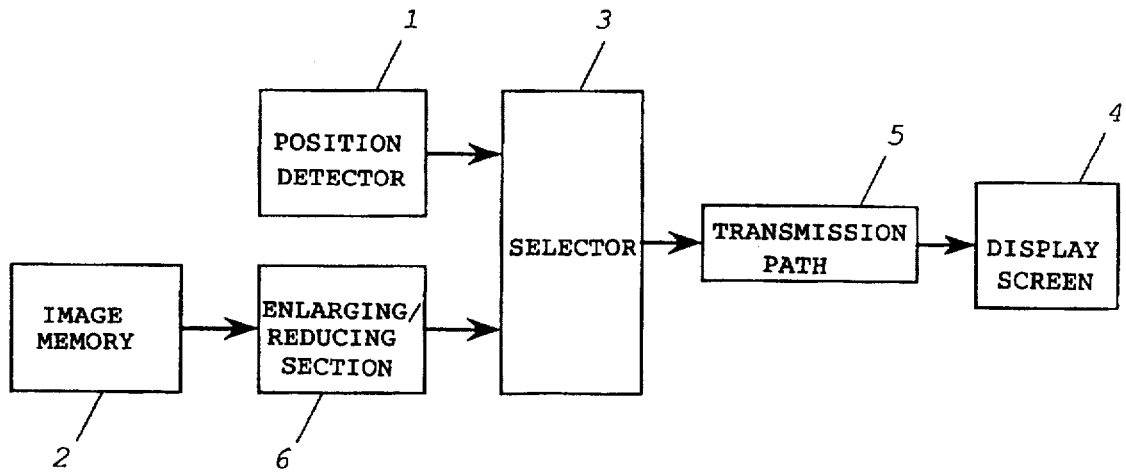
FIG. 7 is a block diagram of a display apparatus according to a third embodiment of the present invention.
Figure 8:
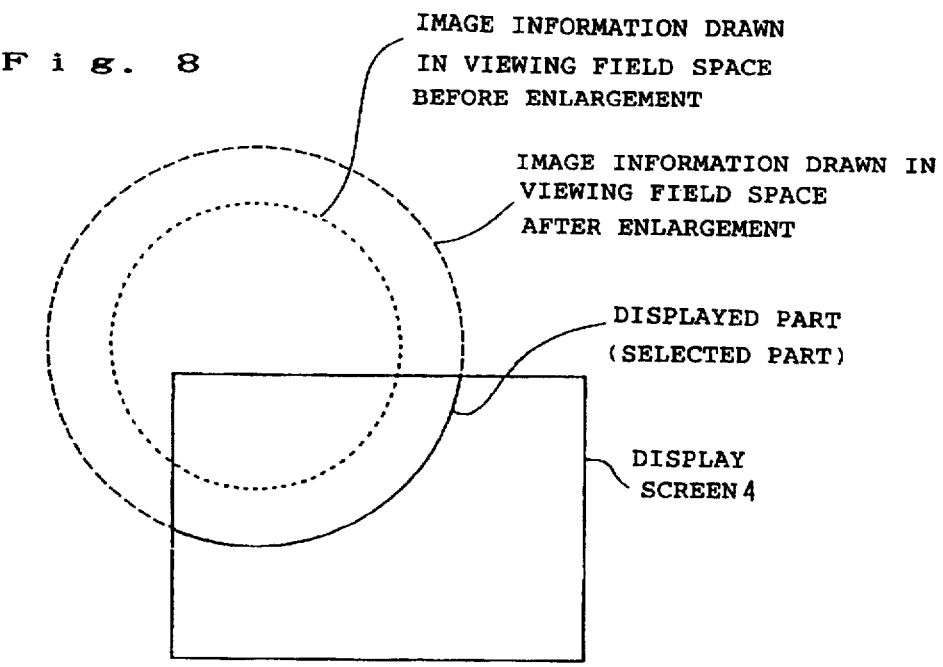
FIG. 8 is a diagram for explaining how image information is displayed on the display apparatus of FIG. 7.

FIG. 7 shows a block diagram for the display apparatus of the third embodiment, and FIG. 8 is a diagram for explaining how image information is displayed on the display apparatus of FIG. 7. As in FIG. 6, the numeral 1 is a position detector, 2 is an image memory, 3 is a selector, 4 is a display screen, and 5 is a transmission path. Further, the numeral 6 designates an enlarging/reducing section for enlarging or reducing the display size of image information according to this embodiment.

As in the second embodiment, the position detector 1 detects the position of the display screen 4, the image memory 2 stores image information, and the transmission path 5 carries image information for transmission.

The enlarging/reducing section 6, as shown in FIG. 8, enlarges or reduces the display size of the image information (a circle in the example of FIG. 8) stored in the image memory 2 (FIG. 8 shows an example of enlargement). Based on the position of the display screen 4 detected by the position detector 1, the selector 3 selects the image information (the solid line part in FIG. 8) to be drawn in the position of the display screen 4 when it is assumed that the entire display image enlarged or reduced by the enlarging/reducing section 6 is drawn in a viewing field space fixed relative to the eye.

Next, the operation of this embodiment will be described. It is assumed that the entire image information is first enlarged or reduced in size by the enlarging/reducing section 6 and then drawn in the viewing field space fixed relative to the eye. Then, based on the position of the display screen 4 detected by the position detector, the selector 3 selects the portion of the image drawn in the subspace that the display screen 4 occupies in the viewing field space. Here, when the position of the display screen 4 is moved, the display image is updated according to the movement of the display screen 4; as a result, the image shown on the display screen 4 as part of the image information drawn in fixed relationship in the viewing field space can be fixed relative to the eye.

According to this embodiment, the display image can be enlarged or reduced as desired, and by moving the position of the display screen 4, the portion of the image displayed on the display screen 4 can be updated accordingly while holding the enlarged or reduced display image fixed in the viewing field space. Furthermore, the position of the displayed portion of the entire image information can be recognized from the position of the display screen 4.

(Embodiment 4)

A fourth embodiment of the present invention will be described below with reference to FIGS. 9 and 10. Like the display apparatus of the third embodiment, the display apparatus of the fourth embodiment is characterized in that an image enlarging/reducing function is provided for enlarging small images or reducing large images in size for easy viewing.

Figure 9:
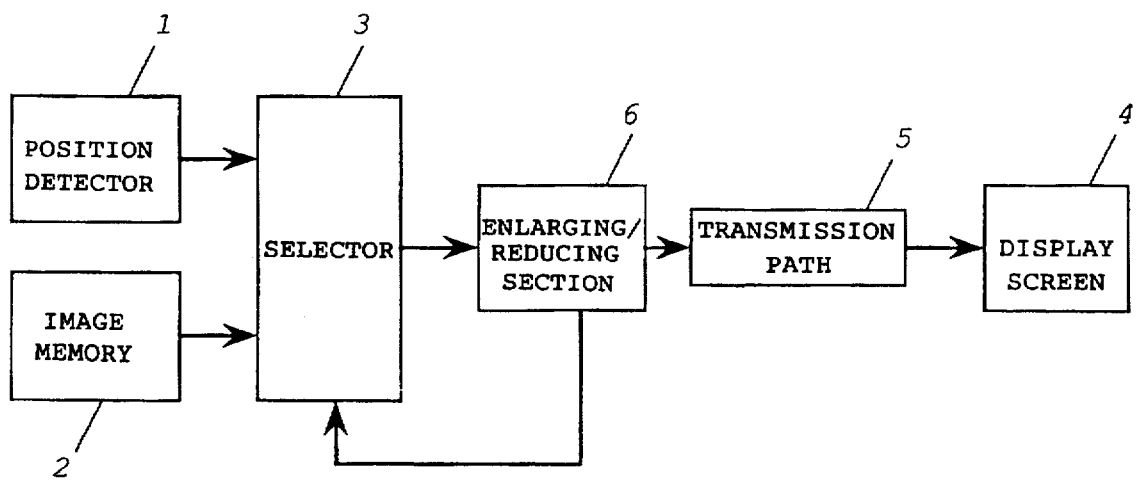
FIG. 9 is a block diagram of a display apparatus according to a fourth embodiment of the present invention.
Figure 10:
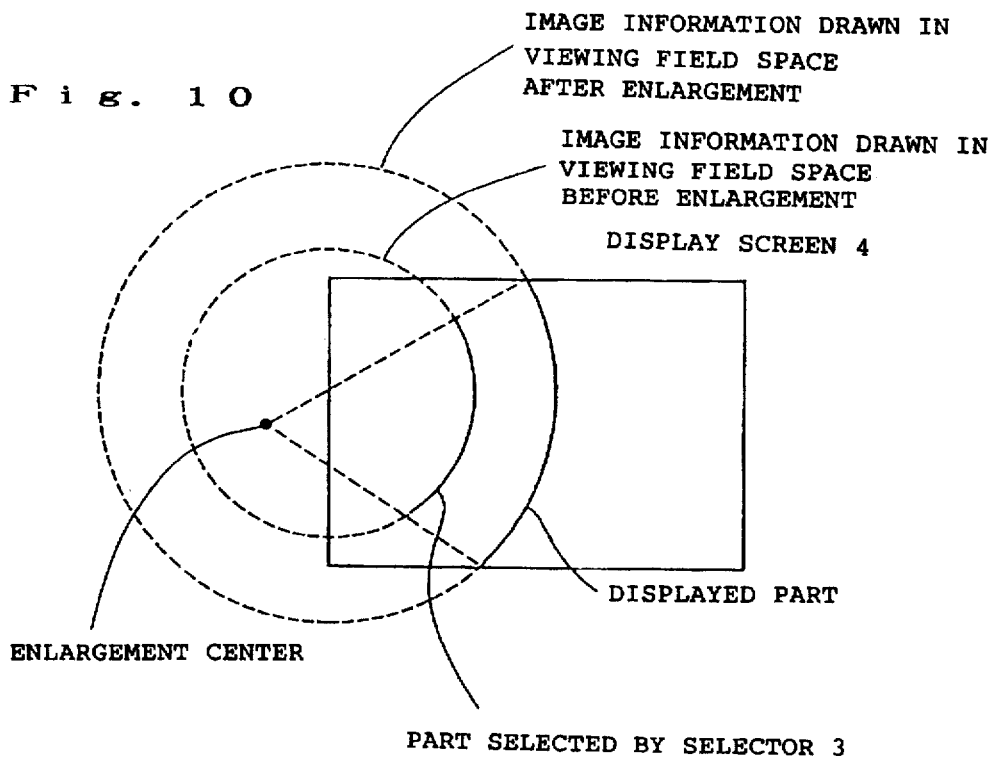
FIG. 10 is a diagram for explaining how image information is displayed on the display apparatus of FIG. 9.

FIG. 9 shows a block diagram for the display apparatus of the fourth embodiment, and FIG. 10 is a diagram for explaining how image information is displayed on the display apparatus. As in FIG. 7, the numeral 1 is a position detector, 2 is an image memory, 3 is a selector, 4 is a display screen, 5 is a transmission path, and 6 is an enlarging/reducing section. As compared to the third embodiment in which the enlarging/reducing section 6 is placed between the image memory 2 and the selector 3, the enlarging/reducing section 6 in the present embodiment is placed between the selector 3 and the transmission path 5.

The operation of the fourth embodiment will be described with reference to FIG. 9. As in the first and second embodiments, the position detector 1 detects the position of the display screen 4, and the image memory 2 stores image information. Based on the position of the display screen 4 detected by the position detector 1 and on the enlargement or reduction ratio supplied from the enlarging/reducing section 6, the selector 3 selects the image information (the solid line part before enlargement in FIG. 10) that is expected to be drawn on the display screen 4 when the image information (the circle shown in FIG. 10), supplied from the image memory 2 and enlarged or reduced in size by the enlarging/reducing section 6, is drawn in a viewing field space. The selected image information is then supplied to the enlarging/reducing section 6.

The enlarging/reducing section 6 enlarges or reduces the image information and outputs it onto the transmission path 5 for transmission to the display screen 4. The display screen 4 displays the enlarged or reduced image information (the solid line part after enlargement in FIG. 10).

As the position of the display screen 4 detected by the position detector 1 is moved, the selector 3 updates the selected image information according to the movement.

According to the present embodiment, the display image can be enlarged or reduced as desired, as in the third embodiment. Furthermore, by moving the position of the display screen 4, the displayed part of the enlarged or reduced display image can be updated while holding the display image fixed in the viewing field space. Moreover, the position of the displayed part of the entire image information can be recognized from the position of the display 4 screen.

Figure 11:
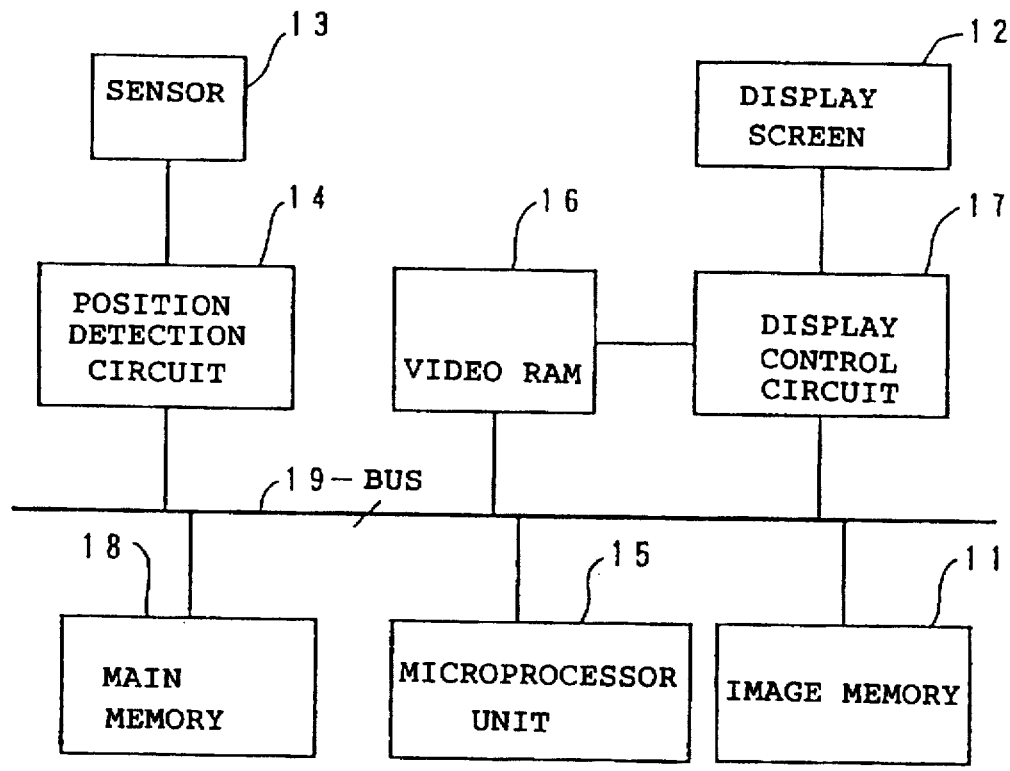
FIG. 11 is a circuit block diagram showing a specific example of a circuit configuration for the display apparatus of each embodiment.

Referring now to FIG. 11, we will describe a specific example of a circuit configuration for the display apparatus according to the first to fourth embodiments.

FIG. 11 is a circuit block diagram showing the configuration of the display apparatus, wherein the numeral 11 is an image memory, 12 is a display screen, 13 is a sensor, 14 is a position detection circuit, 15 is a microprocessor unit (MPU), 16 is a video RAM, 17 is a display control circuit, 18 is a main memory, and 19 is a bus.

The image memory 11 stores image information, for example, in bit-mapped or coded form. The display screen 12 is constructed, for example, from a liquid-crystal display, and the size, shape, and other physical dimensions thereof are not specifically restricted; it should be placed, for example, on a desk in such a manner as to be movable with respect to the given viewing field space and should be configured to display images. The sensor 13 is used to detect the distance (position), velocity, acceleration, etc. with respect to a reference point, and may be constructed, for example, from a laser range finder, or a position detection device having a similar mechanism to that of a mouse. The position detection circuit 14 detects the position of the display screen 12 on the basis of the output of the sensor 13.

When a distance sensor is used as the sensor 13, the position detection circuit 14 can detect the position of the display screen 12 directly from the distance detected by the sensor 13. When a velocity sensor is used as the sensor 13, the position detection circuit 14 first obtains the moving distance with respect to the reference point by integrating the output of the sensor 13, and then detects the position of the display screen 12 from the thus obtained distance. When an acceleration sensor is used as the sensor 13, the position detection circuit 14 first obtains the moving distance with respect to the reference point by double-integrating the output of the sensor 13, and then detects the position of the display screen 12 from the thus obtained distance.

The display control circuit 17, under the control of the microprocessor unit 15, works to bring the image information stored in the video RAM 16 onto the display screen 12.

The main memory 18 is used to store programs for controlling the operation of the microprocessor unit 15, the enlargement or reduction ratio of the image information, etc. The bus 19 includes a control bus, a data bus, and an address bus, and is used to transmit information between the circuit blocks.

In the case of the first and second embodiments, the microprocessor unit 15, for example, accesses the position detection circuit 14 at predetermined intervals of time to obtain the information about the position of the display screen 12, extracts the image information portion corresponding to the position of the display screen 12 from the entire image information stored in the image memory 11, and writes the extracted image information into the video RAM 16. On the other hand, in the case of the third and fourth embodiments, the microprocessor unit 15, for example, enlarges or reduces the size of the image information stored in the image memory 11, accesses the position detection circuit 14 at predetermined intervals of time to obtain the information about the position of the display screen 12, extracts the image information portion corresponding to the position of the display screen 12 from the enlarged or reduced image information, and writes the extracted image information into the video RAM 16. The contents of the video RAM 16 are displayed on the display 12 under the control of the display control circuit 17.

According to the configuration of FIG. 11, when the movement of the display screen 12 is detected by the sensor 13 and the position detection circuit 14, the stored contents of the video RAM 16 are updated according to the movement of the display screen 12, and the image displayed on the display screen 12 changes accordingly. In other words, by changing the position of the display screen 12, the image information to be displayed thereon can be selected. Furthermore, the displayed image can be fixed relative to the eye of the operator.

Figure 12A:
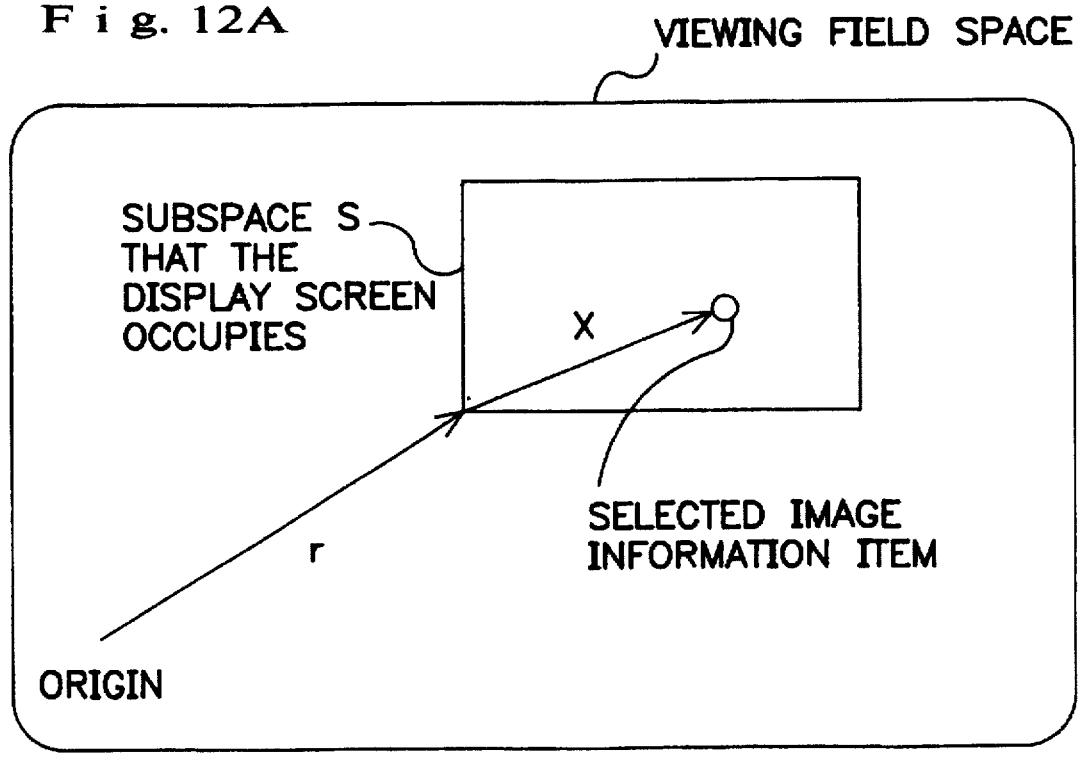
Figure 12B:
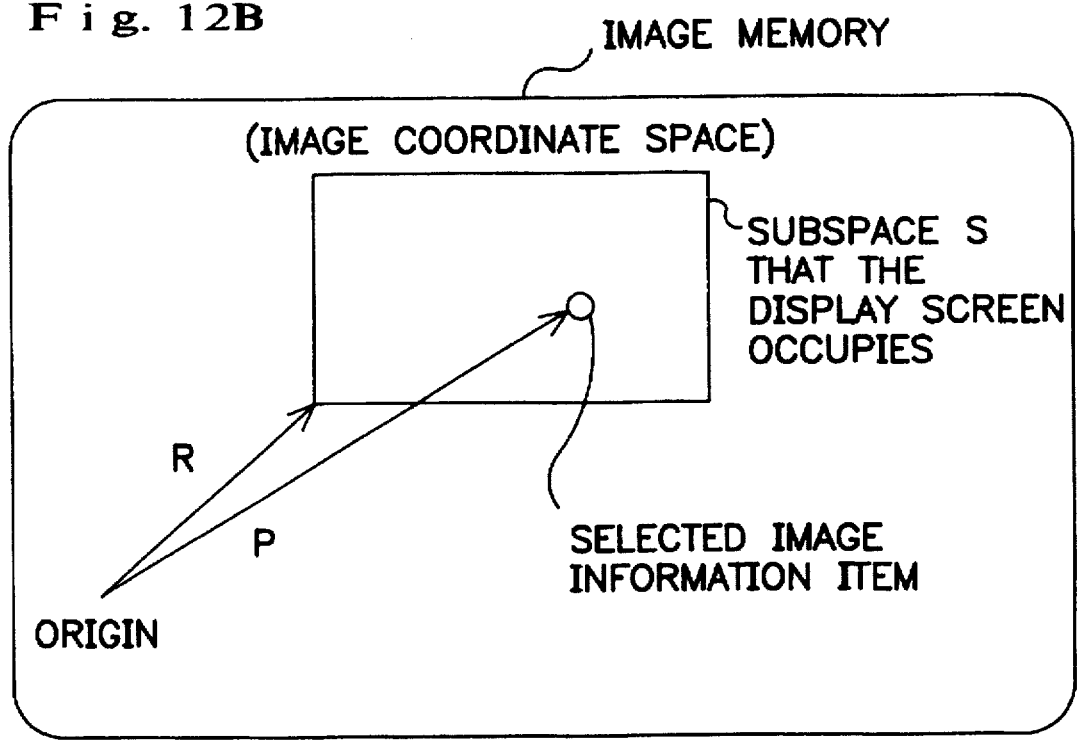

Next, we will describe an example of a method of selecting image information based on the position of the display screen, and relations between viewing field coordinates and image coordinates. FIG. 12(a) shows the viewing field coordinates in a viewing field space, and FIG. 12(b) shows the image coordinates by which image information within the image memory is represented. It is assumed here that the image coordinates are converted into the coordinates in the viewing field space by using a function f.

In FIG. 12, r is a vector indicating the coordinates of the display screen in the viewing field space; x is a vector indicating the display coordinates of a selected image information item on the display screen; s is a subspace that the display screen occupies in the viewing field space; R is a vector indicating the position of the display screen in the image coordinate space; P is a vector indicating the image coordinates representing the selected image information item; and S is a subspace that the display screen occupies in the image coordinate space.

The position r (the position of the tip of the vector r) of the display screen in the viewing field coordinate space, detected by the position detector, is converted into the position R (the position of the tip of the vector R) in the image coordinate space as shown by Equation (1).

$$R = f^{-1}(r) \qquad (1)$$

The subspace s, with the vector r as the origin, which the display screen occupies in the viewing field space, is converted, as shown by Equation (2), into the subspace S, with the vector R as the origin, which the display screen occupies in the image coordinate space.

$$S = f^{-1}(s) \qquad (2)$$

The function $f^{-1}$ is the inverse function of the function f. The selector selects from the entire image information the image information drawn in the subspace S. The image coordinates P of the image information selected by the selector is converted, as shown by Equation (3), into the display coordinates x on the display screen with the position r as the origin.

$$x = f(P) - r \qquad (3)$$

Here, the image information having the coordinates x is supplied to the display screen for viewing.

Now suppose that the display screen is moved to position $r_2$. The coordinates P of the selected image information, at this time, is converted into the display coordinates $x_2$ as shown by Equation (4).

$$x_2 = f(P) - r_2 \qquad (4)$$

The image information having the coordinates P before the movement was displayed at position r+x in the viewing field space as shown in FIG. 12 (a).

This position is expressed by f(P) in Equation (3). On the other hand, the position of the same image information in the viewing field space, after the movement, is given by $r_2 + x_2$. This position is expressed by f(P) in Equation (4), which shows that the position is the same as before the movement.

As described, the position in the viewing field space of the image information displayed on the display screen remains unchanged, so that the displayed image information is fixed relative to the eye. That the position of the image information remains unchanged in the viewing field space also means that the entire image information stored in the image is fixed in the viewing field space. Accordingly, the position of the displayed part of the entire image information can be recognized from the position of the display screen.

The coordinate system in the viewing field space may be made equal to that in the image memory, and the function f may be chosen to be a non-converting function. This arrangement serves to achieve a reduction in the size of the apparatus as well as an increase in the processing speed.

Furthermore, if the function f is chosen to be a function for performing the enlargement or reduction of a displayed image, the image information stored in the image memory can be enlarged or reduced in size for viewing without the enlarging/reducing section of the third and fourth embodiments, thereby making small and large images easier to see.

The present invention is not limited to the above illustrated embodiments, but various modifications may be made in the invention.

What is claimed is:

1. A display apparatus comprising:

a movable display screen adapted to be physically moved on a surface of a base, position detecting means for detecting a position of the movable display screen on the surface of the base, image storing means for storing image information for an entire image, and selecting means for selecting a portion of the image information stored in the image storing means in accordance with the position of the movable display screen on the surface of the base and for causing the selected portion of the image information to be displayed on the movable display screen such that a relation of the displayed portion to the entire image is easily recognized from the position of the movable display screen relative to the base.

2. A display apparatus according to claim 1, wherein the position detecting means detects the position of the movable display screen on the basis of at least one of three parameters including an amount of movement, a velocity of movement, and an acceleration of movement of the movable display screen.

3. A display apparatus according to claim 1, wherein signal transmission from the selecting means to the movable display screen is performed via a wireless or wired transmission path.

4. A display apparatus comprising:

a movable display screen physically movable, on a surface of a base, to differing positions with respect to a viewing field space, position detecting means for detecting a position of the movable display screen on the surface of the base, image storing means for storing image information for an entire image, and selecting means for selecting a portion of the image information stored in the image storing means in accordance with the position of the movable display screen on the base and for causing the selected portion of the image information to be displayed on the display screen, wherein, when an entire image information stored in the image storing means corresponds to the viewing field space, the selecting means selects a part of the image information corresponding to a subspace of the viewing field space that the movable display screen occupies such that a relation of the displayed portion to the entire image is easily recognized from the position of the movable display screen relative to the base.

5. A display apparatus according to claim 4, wherein the position detecting means detects the position of the display screen on the basis of at least one of three parameters including an amount of movement, a velocity of movement, and an acceleration of movement of the display screen.

6. A display apparatus according to claim 4, wherein signal transmission from the selecting means to the display screen is performed via a wireless or wired transmission path.

7. A display apparatus comprising:

a movable display screen physically movable, on a surface of a base, to differing positions with respect to a viewing field space, position detecting means for detecting a position of the movable display screen on the surface of the base, image storing means for storing image information, enlarging/reducing means for accepting image information from the image storing means and for enlarging or reducing a size of the image information to be drawn in a viewing field space, and selecting means for selecting a portion of the image information held in the enlarging/reducing means in accordance with a position of the movable display screen on the base and for causing the selected portion of the image information to be displayed on the movable display screen, wherein, when an entire image information held in the enlarging/reducing means corresponds to the viewing field space, the selecting means selects a part of the image information corresponding to a subspace of the viewing field space that the movable display screen occupies such that a relation of the displayed portion to the entire image is easily recognized from the position of the movable display screen relative to the base.

8. A display apparatus according to claim 7, wherein the position detecting means detects the position of the display screen on the basis of at least one of three parameters including an amount of movement, a velocity of movement, and an acceleration of movement of the display screen.

9. A display apparatus according to claim 7, wherein signal transmission from the selecting means to the display screen is performed via a wireless or wired transmission path.

10. A display apparatus comprising:

a movable display screen physically movable, on a surface of a base, to differing positions with respect to a viewing field space, position detecting means for detecting the position of the movable display screen on the surface of the base, image storing means for storing image information, selecting means for selecting a portion of the image information stored in the image storing means in accordance with the position of the movable display screen on the base and for causing the selected portion of the image information to be displayed on the movable display screen, and enlarging/reducing means for accepting the image information selected by the selecting means and for enlarging or reducing a size of the selected image information to be drawn in the viewing field space, wherein, when an entire image information stored in the image storing means is enlarged or reduced in size and drawn in the viewing field space, the selecting means selects a part of the image information corresponding with a subspace of the viewing field space that the movable display screen occupies such that a relation of the displayed portion to the entire image is easily recognized from the position of the movable display screen relative to the base.

11. A display apparatus according to claim 10, wherein signal transmission from the enlarging/reducing means to the movable display screen is performed via a wireless or wired transmission path.

12. A display apparatus according to claim 10, wherein the position detecting means detects the position of the display screen on the basis of at least one of three parameters including an amount of movement, a velocity of movement, and an acceleration of movement of the display screen.

13. A display method comprising the steps of:

providing a movable display screen physically movable, on a surface of a base, to differing positions with respect to a viewing field space, detecting a position of the movable display screen on the surface of the base, designating, on the basis of the detected position, a subspace that the movable display screen occupies in the viewing field space when an entire image information corresponds to the viewing field space, and supplying, for display purposes, the portion of the entire image information corresponding to the subspace portion of the viewing field space occupied by the movable display screen such that a relation of the displayed portion to the entire image is easily recognized from the position of the movable display screen relative to the base.

* * * * *